Figure 1:
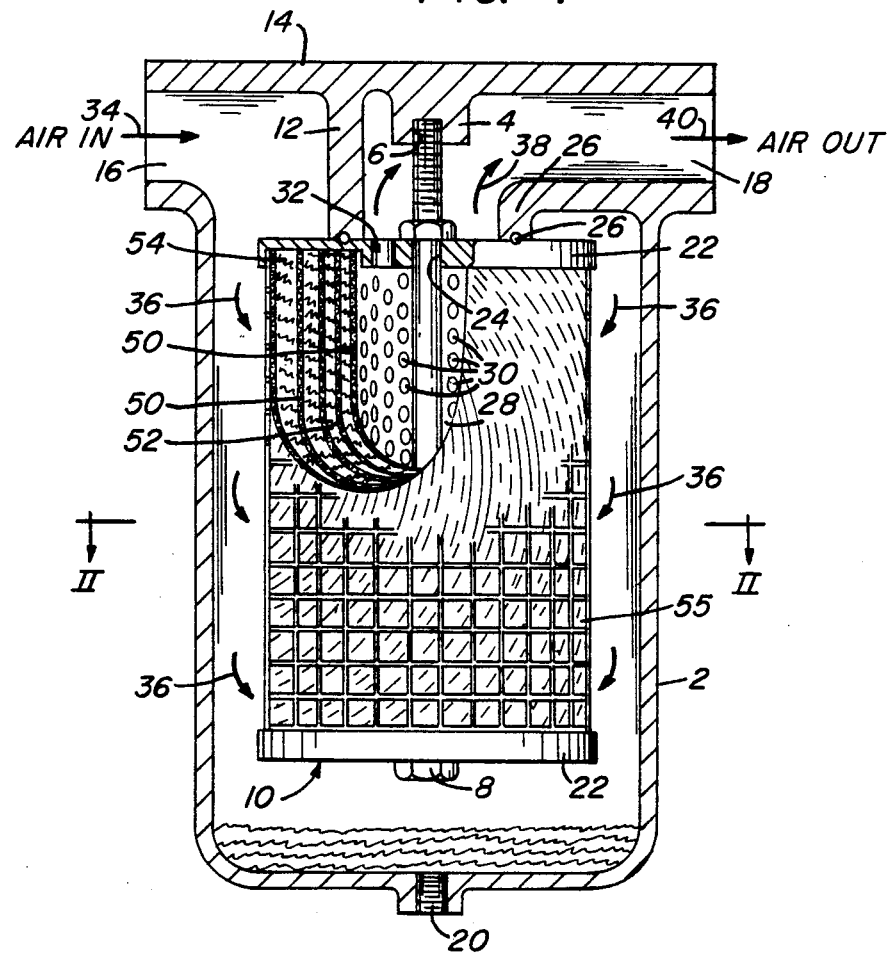

United States Patent [19]

Foltz

[11] Patent Number: 4,976,759
[45] Date of Patent: Dec. 11, 1990

[54] FILTER

[75] Inventor: Donald R. Foltz, Pittsburgh, Pa.

[73] Assignee: Hankison Corporation, Canonsburg, Pa.

[21] Appl. No.: 885,193

[22] Filed: Jul. 14, 1986

[51] Int. Cl.⁵ .............................. B01D 46/00
[52] U.S. Cl. ........................ 55/487; 55/489; 55/498
[58] Field of Search ................. 55/487–489, 55/500, 385 A, 498

[56] References Cited

U.S. PATENT DOCUMENTS

| 3,063,888 | 11/1962 | Howard et al. | 55/487 X |
| 3,262,578 | 7/1966 | Dennis | 55/487 X |
| 3,721,069 | 3/1973 | Walker | 55/487 X |
| 3,802,160 | 4/1974 | Foltz | 55/487 X |
| 4,032,457 | 6/1977 | Matchett | 55/487 X |
| 4,102,785 | 7/1978 | Head et al. | 55/487 X |
| 4,141,703 | 2/1979 | Mulchi | 55/487 X |
| 4,333,745 | 6/1982 | Zeshwick | 55/385 A X |
| 4,350,507 | 9/1982 | Greenough et al. | 55/487 X |

Primary Examiner—Charles Hart

[57] ABSTRACT

A filter of a structure to remove extremely fine solid particulate matter suspended and carried by flowing compressed air which air stream has been previously treated so that it is essentially dry and liquid free. The filter is designed to operate efficiently on a continuous basis without prematurely clogging and is capable of removing all solid particulates larger than 1 micron mean diameter (0.00004 inches mean diameter) and a substantial number of particles of submicronic size.

12 Claims, 1 Drawing Sheet

FILTER

BACKGROUND OF THE INVENTION

In the use of pressurized air for various purposes such as industrial, experimental or medical purposes, it is common practice to remove liquid and solid contaminants prior to the utilization of the compressed air. One common contaminant in compressed air is water vapor, which since it can condense to liquid water due to a temperature drop, is customarily removed by a suitable desiccant system as is well known in the art. A particular disadvantage of desiccant systems is that desiccants degrade such as by attrition during use and introduce solid particulate matter (desiccant fines) into the stream of compressed air passing therethrough. Silica gel, activated alumina, and molecular sieves are commonly used desiccants in pressurized air systems and the particulate matter generated by such materials is in the overall size range of 200 to 1 microns with a preponderance of the particles being less than 20 microns.

Prior art filters for the applications intended for this invention are based on one of two filtration techniques: surface filtration; in-depth fibrous bed filtration. Each of these types of filters, although they can be designed to be highly efficient, have a propensity for clogging and a relatively short service life. To retain their efficiency, the only means utilized to extend service life is to increase their physical size and the quantity of filter media utilized which is usually not economically feasible or does not make for a practically compact design.

Surface type filters operate on the principle that a dust layer collects on the surface of the filter medium and the dust layer itself becomes the effective filter medium. The pores in the surface filter media are usually many times the size of the dust particles so that collection efficiency is low until this dust layer is built up. Ordinarily in this type of filter, design must be such that pressure drop across the built-up dust layer is limited, which limits the depth of this dust bed build-up and the flow rate of the gaseous fluid. If the pressure drop across this dust bed is excessive, bed rupture can occur and result in a severe loss of filtration efficiency. Also, during initial startup and before sufficient particles have been collected to build up a "precoat" in the surface filter pores, filtration efficiency is very low. If the pore size is initially made small enough to restrict the passage of the smaller particles to overcome this initially low filtration efficiency, extremely rapid clogging occurs before bed build-up can occur.

In-depth type filters consisting of a fibrous bed operate on the principle of the fibers collecting the dust particles by three basic mechanisms: impingement, i.e., the particle impacts the fiber; interception, i.e., the particle grazes the fiber and adheres to it; diffusion, i.e., the particle, because of its small size and random movement independent of the air path, deposits on the fiber. Such filters can be designed to be highly efficient even for submicronic particles and do contain considerable void volume. However, since all of the full size range of particles are collected within the filter media, including coarser particles, such filters can become clogged because of their finite volume to retain particles or contain a non-uniform distribution of solid particles resulting in air "channeling" and result in a loss of efficiency. If the in-depth type filter is designed to be efficient for the collection of very small particles, this requires very fine bed fibers. When the gas contains a broad range of size of particles, the larger size particles are all collected near the surface of the filter bed and can "choke" the fine fibers leading to high pressure drop, loss of stability of the bed, and by the resulting compression of the bed decrease the filtering capability of the underlying fibers.

BRIEF DESCRIPTION OF THE INVENTION

This invention overcomes the disadvantages of the surface type filter media and in-depth fibrous bed type filter media by combining both types of filter media uniquely to make use of their advantages and minimize their disadvantages of periodic or premature loss of efficiency or reduced service life under normal operating circumstances. This unique combination also results in a compact filter design by minimizing the flow limitations inherent in each of the types of filter medias used separately.

Accordingly, one object of this invention is to provide a filter for particles in the 20 to sub-micron size which utilizes alternate surface type filter means and in-depth fibrous bed type filter media.

Another object of this invention is to provide a new and improved filter for removing entrained particles in a flowing air stream in the range of 20 microns to 1 micron and a portion of sub-micron particles also entrained in said stream.

Still another object of this invention is to provide a new and improved filter for removing entrained particles in a flowing air stream in the range of 20 microns to 1 micron and a portion of sub-micron particles also entrained in said stream by utilizing fiberglass filter medias capable of withstanding elevated temperatures.

A further object of this invention is to provide a new and improved filter for removing entrained particles in a flowing air stream in the range of 20 microns to 1 micron and a portion of sub-micron particles also entrained in said stream in which the filter media is in the form of a spiral, thereby simply allowing for multiple in-series filtering layers as required for the application.

Figure 2:
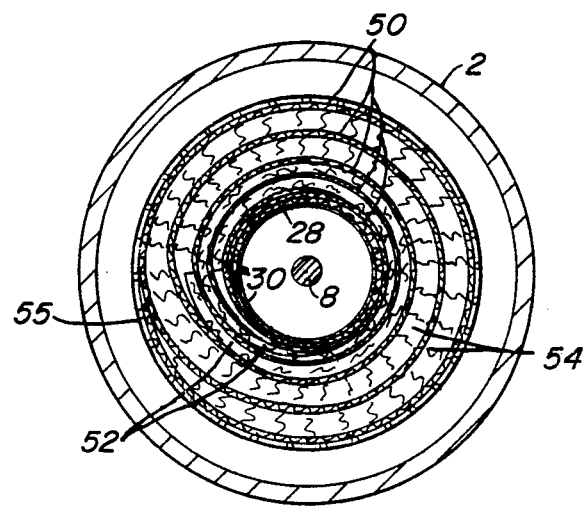

These and other objects of this invention will become more apparent upon consideration of the following detailed description and illustration of a presently preferred embodiment thereof, in which:

FIG. 1 is a cross sectional view with portions thereof being broken away to more clearly illustrate the structure thereof; and FIG. 2 is a cross sectional view of the structure shown in FIG. 1 taken along the line II—II thereof.

DESCRIPTION OF THE PRESENTLY PREFERRED EMBODIMENT

A filter constructed in accordance with the principles of this invention comprises a formed generally cylindrical housing 2, usually formed from a suitable rigid material such as metal, plastic or the like. Housing 2 is formed to define the air flow passageways and an interior cavity which cavity suitably receives a filter, filter cartridge or filter element 10 therein to remove solid particles entrained in an incoming gas stream. Inasmuch as the filter 10 of this invention is primarily intended for use in compressed air applications the gas stream will hereinafter be referred to as an air stream. As is known, the housing 2 has a central downwardly extending boss 4 therein with an upwardly extending central threaded opening 6 therein for receiving the upper end of a central upwardly extending mounting bolt 8. Housing 2 has an integral annular portion 12, which extends downwardly from an upper end portion 14 of housing 2, and which is spaced inwardly from the outer side surface of housing 2. An upper portion of the side of housing 2 is provided with a suitable formed air inlet passageway 16 with the interior of passageway 16 being defined by the integral portion 12. Housing 2 is also provided with an integral discharge passageway 18 which is preferably diametrically opposed from the inlet 16. With such structure the space defined by integral portion 12 adjacent the upper end of housing 2 is open to the discharge passageway 18. Housing 2 is also provided at its lowermost portion with a suitable selectively removable plug or valve 20 to permit material which has accumulated within the lower portion of housing 2 to be removed as desired—i.e., to be selectively removed. Although not shown, housing 2 can be provided with suitable means to permit the lower portion of housing 2 to be removed to permit a new filter 10 to be installed without requiring the lines connected to the inlet 16 and outlet 18 to be disconnected. Inasmuch as the structure of housing 2 is of a type as is known, further description thereof is not necessary to one reasonably skilled in the relevant prior art.

Filter 10 is a cylindrical member having a pair of axially spaced end caps 22 which caps 22 are formed from a suitable rigid material such as metal or plastic. Centerbolt 8 passes through suitable clearance openings 24 in caps 22 such that the filter 10 is suitably rigidly secured to housing 2 by the threaded engagement of bolt 8 with threaded opening 6. A suitable seal 26, as is known, is provided between the lower end of integral portion 12 and the upper end cap 22 to prevent unfiltered air flow between the portion 12 and the upper end of the filter 10. Such seal 26 is of any suitable type such as a known gasket, adhesive, O-ring or the like. In order to provide sufficient axial strength to the filter 10 to permit bolt 8 to be tightened as desired the inner portion of filter 10 comprises a suitable rigid tubular member 28 formed from a suitable metal or plastic. Tube 28 extends axially between the caps 22 with bolt 8 extending centrally thereof. Member 28 is provided with a plurality of suitable axially and circumferentially spaced rows of openings 30 to permit filtered air to pass therethrough without an undesired pressure drop occurring. The upper cap 22 is provided with suitable circumferentially spaced openings 32 in open engagement with the interior of tube 28 and the interior of the portion 12 whereby filter air flows without undesired pressure drop to the discharge 18. As shown air, normally compressed air for the purposes of this invention, enters through inlet 16 (see arrow 34) and passes downwardly in housing 2 between the interior of housing 2 and the cylindrical exterior of filter 10 (see arrows 36). The air then sequentially passes radially through filter 10, through openings 30 in tube 28, openings 32 in the upper cap 22, through the interior of portion 12 (see arrows 38) and is discharged through the discharge passageway 18 (see arrow 40).

In constructing the filter 10 a continuous wrapper of glass fabric filtering cloth 50 is wound about the outside of tube 28 to encompass the axial extent of tube 28 with two overlapping layers of cloth 50. After forming the two overlapping layers of cloth 50, the winding of cloth 50 is continued to form a first annular space about tube 28. As such space is formed an in-depth filter media 52 (consisting of a blend of glass strands and microfibers) is inserted simultaneously with the winding of cloth 50. Thus a spiral layer of media 52 outwardly encompassed by a layer of cloth 50 is simultaneously formed. Such spiral winding is continued until at least two 360 degree overlapping spiral layers of filter media 52 are formed. The 360 degrees of overlap is not critical and the amount of overlap of media 52 is determined by the conditions under which the filter 10 is to be used. In particular three or more overlapping layers of media 52 can be provided as desired. After the insertion of media 52 is concluded, the spiral winding of cloth 50 is continued with the cloth 50 being spaced outwardly from the previously wound cloth 50. An in-depth filter media 54 is simultaneously spirally wound with the cloth 50 around the previously wound media 52 with the media 54 being located radially between layers of cloth 50. Thus, a spiral filter media 54 is simultaneously provided with cloth 50 to spirally overlap the media 52. Media 54 is preferably wound in at least two spiral overlapping layers; however, more than two spiral layers of media 54 may be provided as desired. Media 54 consists of matted fine glass fibers. After the desired layers of media 54 are provided the spiral winding of fiberglass filtering cloth 50 is continued for an additional one or more wraps as desired to serve as an outside cover for the media 54. The above described spiral windings are then encased in a cylindrical wire cloth 56. Preferably the inner end of media 54 abuts the outer end of media 52 to prevent any gap therebetween since a gap could permit channeling of air flow therethrough. Filter medias 52 and 54 consist of a high percentage of voids or spaces which voids are desired for particle collection efficiency maximizing the filtration mechanisms of the fibers and to provide volume for particle accumulation. Accordingly, in the winding of cloth 50 and medias 52 and 54 the cloth 50 is wound in a manner to assure slight compression and stabilization of medias 52 and 54 without crushing of the medias 52 and 54 and appreciably reducing void space. After winding, cloth 50 provides a low degree of axial rigidity whereby the layers of medias 52, 54 remain uncrushed during insertion between the end caps 22. After the forming of the layers of media 52, 54 with cloth 50 the entire structure is encased in a wire reinforced cloth 55 which provides sufficient rigidity to the wound structure to permit its handling, with care, without crushing medias 52, 54. Alternatively, medias 52, 54 and cloth 50 may, if desired, be of cylindrical or other closed configurations.

Typical construction materials for medias 52, 54 and cloths 50, 55 are as follows, although variations in their specifics may be utilized to suit a particular application requirement:

Cloth 55—wire cloth with a galvanized steel reenforcing gridwork, 5 mesh cloth, 0.041" wire, 62.3% open area.

Media 52—blend of or glass strands and microfibers, thickness 0.014", grade No. 232—manufactured by Lydal, Inc.—Technical Papers Division.

Fiberglass woven fabric 50—style 7628, 42×32 construction, plain weave, 0.007" thickness—manufactured by Burlington Glass Fabrics Company.

Media 54—fiberglass fiber matting, ¼" thick, type AF-11—manufactured by Manville Products Corporation.

Perforated core tube 28—steel electrolytic tin plate, 3/32" diameter holes on 3/16" centers.

Compressed air containing solid particulates enters the inlet port of the filter element housing as shown in FIG. 1 and thence into the annular space formed by the inside of the housing and the outside of the filter element. A considerable reduction in air velocity occurs as well as a sharp flow directional change as the air stream enters the outside of the filter element. Larger solid particulates due to their inertia are incapable of following the main air stream flow a-d settle or drop to the bottom of the filter housing 2 where they are collected and accumulate, and can be periodically discharged from the system through the opening for plug or valve 20 (plug 20 being removed). In general, these solid particulates are of the size range of 200 to 20 microns.

Compressed air containing solid particulates in the range of 20 to 1 micron enters the outside of the filtering cloth 55 and moves radially and uniformly inward therethrough into the outer layers of glass fabric filtering cloth 50. Initially all of the air passes through the pores of the filtering cloths 55, 50 as does a high percentage of the solid particulates entrained therein. The entrained particles not passing through the pores of cloths 55, 50 begin to build up a dust layer on the outside of the outer cloth 50. Gradually such layer or dust cake begins to bridge the pore openings and becomes an effective filter in itself. This bridging is promoted by small diameter (5 to 10 microns) fibers which extend into the apertures formed by the main thread strands of the glass fabric cloth 50. These fibers substantially form a web in the pore area and arise from the construction of the thread which is formed from multiple filaments. The efficiency of filtration of this bed is mainly dependent on its thickness and mean particle size and in many cases can approach 99% for particles in excess of 1 micron mean diameter, provided the bed is fully developed and is not disintegrated in the area of pore span due to excessive pressure drop across it. All of the dust which penetrates the fabric cloth 50 prior to dust bed development or due to bed disintegration then enters the first layer of in-depth filter media 54. This filter media 54 collects the dust penetrating the outside fabric cloth 50 on its fibers by impingement, interception, and diffusion mechanisms. This fibrous bed 54 consists of fibers of 11 microns mean average diameter and effectively removes all particles down to approximately 3 microns. The air, now containing a lesser concentration of dust, then passes through a second fabric cloth layer 50 into a second innermost in-depth bed of media 54 consisting of fibers of 11 microns mean average diameter. The filtration action of this second layer of fabric cloth 50 and the innermost in-depth bed of media 54 is similar to its preceding counterpart except that the concentration and particle size range of the air stream passing therethrough is less due to the prior filtration. The air stream, after emerging from the second in-depth bed of media 54, passes through a third layer of fabric cloth 50 and enters the outer in-depth bed of filter media 52 which consists of a blend of glass strands and microfibers of an average mean diameter of 3 microns. This material, by impingement, interception and diffusion, effectively removes all particles down to approximately 1 micron. The air then passes through another layer of fabric cloth 50 and enters a second innermost in-depth bed of filter media 52 which effectively removes any residual dust particles and is efficient even for the removal of many submicronic particles. Finally, the contaminant free air passes through an inside wrapping of the fabric cloth 50 which encompasses the inside perforated core tube 28. The inside wrapping of glass fabric cloth 50 serves the function of preventing the migration into the purified air stream of any of the delicate glass fibers contained within the prior in-depth filtering sections.

For certain applications, and where the possibility of the fine web fibers contained within the pores of the glass fabric cloth 50 to migrate exists, a layer of porous surface membrane filter media may be inserted between the innermost wrap of the cloth 50 and the perforated core tube 28. The continuity of the glass fabric cloth 50 from outside wrapper to inside covering of the perforated core tube 28 serves the dual purpose of being a step-wise surface filtration media and additionally supporting and stabilizing the delicate fibers which comprise the in-depth stages of the filtering element.

The selection of the appropriate surface filter media 50 and the in-depth fibrous bed materials, 52 and 54, is of critical importance in achieving the required degree of filtration. The number of filtration stages and their successive arrangement are also of importance to minimize cloggage of the filtering section leading to short service life or decreasing filtration efficiency due to air channeling caused by dis-uniformity of particle deposition.

Since one of the primary applications of this invention is to serve as an after filter to desiccant dryers in a compressed air system, the selection of filter element components must be suitable for this service. In particular, the afterfilter may be subjected to temperatures as high as 450 degrees Fahrenheit. For this reason, as well as the ideal filtering characteristics of the various filter medias incorporated in the design, various forms of glass were selected as the filtering material. Suitable metallic materials and appropriate sealant materials are utilized to meet application requirements.

Having described a preferred embodiment of this invention in accordance with the Patent Statutes, those skilled in the relevant art will be cognizant of the fact that modifications can be made to the described structure without departing from the spirit and scope of this invention. Accordingly, the following claims are to be construed as including modifications of the structures defined herein as would be known to those skilled in the relevant art.

I claim:

1. A filter for removing solid particles from twenty micron to sub-micron size from a gaseous stream comprising:
   surface filtering means having spaced overlying portions which form a first plurality of overlying spaces which overlie a second plurality of overlying spaces,
   a first in-depth filtering means located throughout said first plurality of spaces which is of a structure to filter out three microns and larger solid particles from such a stream, and
   a second in-depth filtering means located throughout said second plurality of spaces which is of a structure to filter out one micron and larger solid particles and some sub-micron particles from such a stream.

2. A filter as set forth in claim 1 wherein said surface filtering means is in the form of a spiral.

3. A filter as set forth in claim 2 wherein said first and second in-depth filtering means are in the form of a spiral.

4. A filter as set forth in claim 3 wherein said first and second in-depth filtering means have end portions in abutting relationship.

5. A filter as set forth in claim 1 wherein said surface filtering means is a woven fiberglass fabric.

6. A filter as set forth in claim 1 wherein each of said in-depth filtering means consists of a blend of glass strands and microfibers.

7. A filter as set forth in claim 6 wherein said glass strands and microfibers in said first plurality of spaces are of a larger size than the glass strands and microfibers in said second plurality of spaces.

8. A filter as set forth in claim 7 wherein said strands and microfibers in said first plurality of spaces have a mean average diameter of 11 microns.

9. A filter as set forth in claim 7 wherein said strands and microfibers in said second plurality of spaces have a mean average diameter of 3 microns.

10. A filter as set forth in claim 1 wherein said filter is cylindrical in form with a central tubular member extending axially therethrough with at least one end of said tubular member being open, said tubular member having a plurality of spaced openings therein to permit flow of gas therethrough.

11. A filter as set forth in claim 10 wherein said surface filtering means encompasses said tubular member.

12. A filter for removing solid particles from a gas stream comprising: a formed housing, a filter means located within said housing, said filter means consisting of filter media arranged in overlying layers to permit such a gas stream to pass therethrough from an upstream portion to a downstream portion, a first plurality of said layers forming said upstream portion and a second plurality of said layers forming said downstream portion, said first plurality of said layers being of a structure to filter out a preponderance of particles 1 micron or larger in size, said second plurality of said layers being of a structure to remove some submicron size particles and any 1 micron or larger sized particles, and fabric means disposed at least between each of said layers to maintain the filtering capability of said layers.

* * * * *